(12) United States Patent
Bonchi et al.

(10) Patent No.: US 9,489,448 B2
(45) Date of Patent: *Nov. 8, 2016

(54) NETWORK GRAPH EVOLUTION RULE GENERATION

(71) Applicant: YAHOO! INC., Sunnyvale, CA (US)

(72) Inventors: Francesco Bonchi, Barcelona (ES); Aristides Gionis, Barcelona (ES); Michele Berlingerio, Bari (IT); Bjorn Bringmann, Brussels (BE)

(73) Assignee: Excalibur IP, LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/138,501

(22) Filed: Dec. 23, 2013

(65) Prior Publication Data

US 2014/0115155 A1    Apr. 24, 2014

Related U.S. Application Data

(63) Continuation of application No. 13/490,247, filed on Jun. 6, 2012, now Pat. No. 8,676,840, which is a continuation of application No. 12/570,582, filed on Sep. 30, 2009, now Pat. No. 8,204,904.

(51) Int. Cl.
| | |
|---|---|
| *G06F 7/00* | (2006.01) |
| *G06F 17/30* | (2006.01) |
| *G06Q 10/10* | (2012.01) |
| *G06F 13/14* | (2006.01) |

(52) U.S. Cl.
CPC ......... *G06F 17/30604* (2013.01); *G06Q 10/10* (2013.01)

(58) Field of Classification Search
CPC .................. G06F 17/30958; G06F 17/30286; G06F 17/30598; G06F 17/30651; G06F 17/30569; G06F 17/30572; G06F 17/301914; G06F 17/5081; G06F 17/30539; G06F 17/30604; G06F 19/12
USPC ....... 707/709, 737–738, 743, 749, 756, 769, 707/776, 798, 736, E17.124, 999.006, 707/999.101, E17.116, 999.1, 999.102, 707/E17.005, 705, 796, 803; 717/144; 715/753, 215; 385/147; 382/128, 173
See application file for complete search history.

(56) References Cited

U.S. PATENT DOCUMENTS 7,233,733 B2 *   6/2007  Derby ................. G06F 11/3604
                                                        385/147
2007/0239677 A1 * 10/2007 Zhao ................. G06F 17/30864

* cited by examiner

*Primary Examiner* — Usmaan Saeed
*Assistant Examiner* — Cecile Vo
(74) *Attorney, Agent, or Firm* — James J. DeCarlo; Greenberg Traurig (57) ABSTRACT

A network's evolution is characterized by graph evolution rules. A graph, formed by merging multiple graphs representing the multiple snapshots of the network, that represents an evolutionary network is mined to identify evolutional patterns of the network. A pattern is selected from the identified patterns. Graph evolution rules are generated using identified evolutional patterns. The generated graph evolution rules represent the evolutional patterns of the network, the rules indicating that any occurrence of a child pattern of the selected pattern implies a corresponding occurrence of the selected pattern.

21 Claims, 7 Drawing Sheets

NETWORK GRAPH EVOLUTION RULE GENERATION

CROSS REFERENCES TO RELATED APPLICATIONS

This application is a continuation of U.S. Non-Provisional application Ser. No. 13/490,247, filed on Jun. 6, 2012, now U.S. Pat. No. 8,676,840, entitled "Network Graph Evolution Rule Generation" which is a continuation of U.S. Non-Provisional application Ser. No. 12/570,582, filed on Sep. 30, 2009, now U.S. Pat. No. 8,204,904, entitled "Network Graph Evolution Rule Generation" the entirety of which is incorporated herein by reference.

FIELD OF THE DISCLOSURE

The present disclosure relates to characterization of a network's evolution, such as a characterization of an evolution of a social network using graph evolution rules, and more particularly to mining a graph that represents an evolutionary network to identify evolutional patterns, and using identified evolutional patterns to generate graph evolution rules, which represent the evolutional patterns of the network.

BACKGROUND

A social network has been described as a social structure of relationships or bonds between individuals, and/or groups of individuals, such as societies. The social structure can be said to be made of individuals (or organizations) called "nodes," which are connected, or related, in some manner.

The social structure can be expressed using conventional network terms, such as nodes and edges, where nodes are entities, such as individuals, groups, etc., and edges, or ties, represent relationships between entities. Social networks can operate on many levels, such as familial, organizational, community, geographical, national, etc. Social networks can be quite complex, and analysis of a social network, or networks, can consume considerable computational resources.

SUMMARY

The present disclosure seeks to address failings in the art and to provide a system, method and apparatus of analyzing temporal evolution of a social network. In accordance with one or more embodiments, a network's evolution is characterized by graph evolution rules. A graph that represents an evolutionary network is mined to identify evolutional patterns of the network, and graph evolution rules are generated using identified evolutional patterns. The generated graph evolution rules represent the evolutional patterns of the network.

In accordance with one or more embodiments, a network, such as and without limitation a social network, is examined to identify patterns, which identify an evolution of the network. In accordance with one or more embodiments, the identified patterns are expressed as one or more rules. The identified patterns can be used in any application in which the evolution of a network is of interest. By way of some non-limiting examples, the patterns can be used as a predictor of the future evolution of the network. The local concentration of patterns in a certain region of the graph might indicate a certain level of evolution/progress in that area. The patterns, as they describe the way the network evolves, can be used to discriminate among different networks and the manner in which each network evolves. These and other observations that are made available via the patterns identified in accordance with disclosed embodiments can be used in applications such as: fraud detection, homeland security, evolution of terrorist networks, information propagation in social networks, group formation, group recommendation, friend recommendation, viral marketing, etc.

In accordance with one or more embodiments, a method is provided, the method comprising collecting, by at least one processing unit, multiple graphs corresponding to a network, the network evolving over time, each graph representing a snapshot reflecting a state of the network; forming, by the at least one processing unit, one graph by merging the multiple graphs representing the multiple snapshots of the network, the formed graph comprising a set of nodes and a set of edges, each edge connecting two nodes from the set of nodes and having a temporal label; mining, by the at least one processing unit, the graph to identify multiple patterns, each pattern being a subgraph in the formed graph, each pattern having an associated support; selecting a pattern from the identified patterns; identifying, by the at least one processing unit, a child pattern of the selected pattern, the identified child pattern having a support that is at least equal to the support of the selected pattern and missing a portion of pattern, the missing portion of the pattern including at least one edge of the pattern; creating, by the at least one processing unit, a graph evolution rule, the rule indicating that any occurrence of the child pattern implies a corresponding occurrence of the pattern, the corresponding occurrence of the pattern being formed with the addition of the portion missing from the child pattern at a time indicated by the missing edge's temporal label. In accordance with at least one embodiment, the temporal label represents the time of the snapshot in which the edge first appeared.

In accordance with at least one embodiment, a system is provided, which system comprises at least one computing device. The at least one computing device comprising a graph merging component that collects multiple graphs corresponding to a network, the network evolving over time, each graph representing a snapshot reflecting a state of the network; and forms one graph by merging the multiple graphs representing the multiple snapshots of the network, the formed graph comprising a set of nodes and a set of edges, each edge connecting two nodes from the set of nodes and having a temporal label; a mining component that mines the formed graph to identify multiple patterns, each pattern being a subgraph in the formed graph, each pattern having an associated support; and a graph evolution rule generator that selects a pattern from the identified patterns; identifies a child pattern of the selected pattern, the identified child pattern having a support that is at least equal to the support of the selected pattern and missing a portion of pattern, the missing portion of the pattern including at least one edge of the pattern; and creates a graph evolution rule, the rule indicating that any occurrence of the child pattern implies a corresponding occurrence of the pattern, the corresponding occurrence of the pattern being formed with the addition of the portion missing from the child pattern at a time indicated by the missing edge's temporal label.

In accordance with at least one embodiment, a computer-readable medium tangibly storing thereon computer-executable process steps, the process steps comprising collecting multiple graphs corresponding to a network, the network evolving over time, each graph representing a snapshot reflecting a state of the network; forming one graph by merging the multiple graphs representing the multiple snapshots of the network, the formed graph comprising a set of nodes and a set of edges, each edge connecting two nodes from the set of nodes and having a temporal label; mining the graph to identify multiple patterns, each pattern being a subgraph in the formed graph, each pattern having an associated support; selecting a pattern from the identified patterns; identifying a child pattern of the selected pattern, the identified child pattern having a support that is at least equal to the support of the selected pattern and missing a portion of pattern, the missing portion of the pattern including at least one edge of the pattern; creating a graph evolution rule, the rule indicating that any occurrence of the child pattern implies a corresponding occurrence of the pattern, the corresponding occurrence of the pattern being formed with the addition of the portion missing from the child pattern at a time indicated by the missing edge's temporal label.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

In general, the present disclosure includes a graph evolution rule generation system, method and architecture.

Certain embodiments of the present disclosure will now be discussed with reference to the aforementioned figures, wherein like reference numerals refer to like components. Embodiments disclose herein may be described with reference to a social network; however, it should be apparent that the embodiments are not limited to a social network, and that the embodiments can be applied to any network that can change over time.

In accordance with one or more embodiments, a network is expressed in terms of a graph, which comprises nodes and edges. Using a more formalistic expression, a graph, G, over a set of nodes, V, and edges, E, with a labeling function used to assign labels to nodes and edges, can be expressed as:

$G=(V,E,\lambda)$ is used to denote a graph G over a set of nodes V and a set of edges, $E \subseteq V \times V$, with a labeling function $\lambda: V \cup E \rightarrow \Sigma$, assigning labels to nodes and edges from an alphabet $\Sigma$. In accordance with one or more embodiment, each edge is defined by an ordered pair of nodes, u, v, from the set of nodes V.

In accordance with at least one embodiment, a label represents a property.

A label can change over time, but is not likely to do so. By way of some non-limiting examples, in a social network where nodes represent members of the social network and edges represent a connection between two members, node properties may be gender, country, college, etc., and an edge property can represent a information, such as type, for the connection.

In accordance with one or more embodiments, a network can be represented in a form of an undirected graph, and the evolution of the graph over time can be conceptually represented by a series of graphs $G_1, \ldots, G_T$, with time, t, from 1 to T. At a given time, t, the graph, $G_t$, can be expressed as $G_t=(V_t, E_t)$, with $V_t$ being a set of nodes that is a subset of V and $E_t$ being a set of edges that is a subset of E. In accordance with one or more embodiments, $G_1, \ldots, G_T$ each represent a different snapshot of the same network. While it is possible for one or more nodes or edges to be deleted over time (e.g., a member or a connection between two members of a social network is deleted) it is more likely that nodes or edges will be added (e.g., a member is added and/or connection between two members of a social network is formed) to the graph over time.

In accordance with one or more embodiments, patterns are mined using a combined dataset, which comprises a single undirected graph, G, obtained by collapsing, or combining, all the snapshots $G_1, \ldots, G_T$, with each edge in graph G time-stamped to indicate a time for its first appearance. In accordance with one or more such embodiments, graph, G, is a time-evolving graph, which can be represented as $G=(V, E, t, \lambda)$, with t corresponding to a time stamp assigned to each edge in the set of edges, E.

Figure 1:
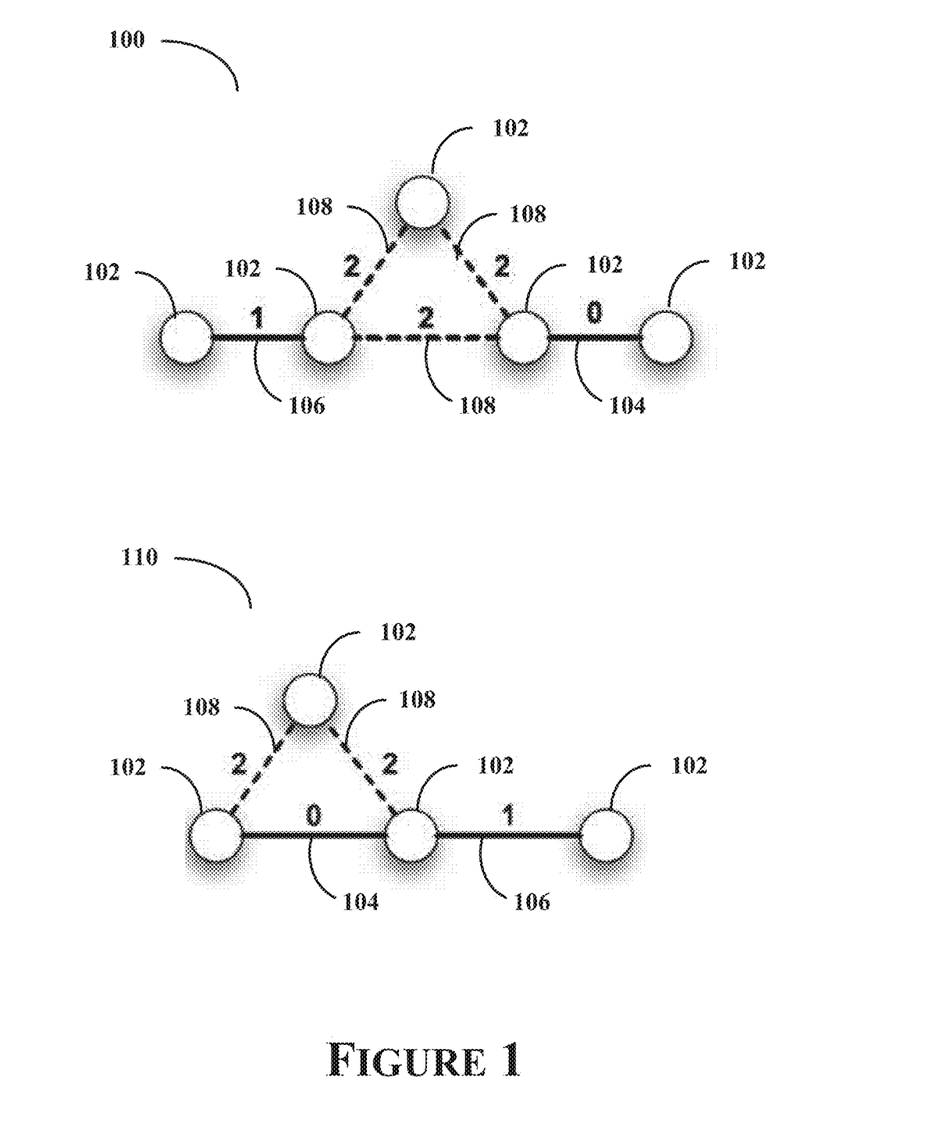
FIG. 1 provides exemplary representations of graph portions in accordance with one or more embodiments of the disclosure.

FIG. 1 provides exemplary representations of graph portions in accordance with one or more embodiments of the disclosure. The graph portions depicted in FIG. 1, and labeled 100 and 110, are patterns, or subgraphs identified in a graph, G, obtained by merging multiple snapshots of a network. Patterns 110 and 110 comprise nodes 102 and edges 104, 106 and 108, which connect nodes 102. Each edge has a label, which identifies a time, in absolute or relative terms, associated with the edge, e.g., a time at which the edge between the two nodes 102 is formed. In accordance with one or more embodiments, a relative time is determined from an absolute time at which an edge is formed. In accordance with one or more embodiments, an absolute time can be an absolute time of the snapshot taken of the network, and a relative time can be a delta, $\Delta$, representing a time gap between a pattern's initial edge and the absolute time of the edge in the merged graph to which the pattern's initial edge is mapped. Each of the edges 104, 106 and 108 has a label, which identifies a time for the edge. In the example, the label is in relative time.

With reference to subgraph 100, edge 104 is the first of the edges formed relative to the other edges in the subgraph 100. Edge 104 represents a connection between two of the nodes 102. Edge 106 is formed after edge 104 and before edges 108. Similarly, with reference to subgraph 110, edge 104 is the first edge formed in the subgraph, followed by edge 106 and edges 108. Each relative time label on edges 104, 106 and 108 represent some increment of $\Delta$.

In accordance with one or more embodiments, each of subgraphs 100 and 110 can represent a pattern. In accordance with one or more such embodiments, a pattern, P, of a time-evolving graph, G, is a subgraph of G that in addition to matching edges of G also matches their time stamps, and if present, the properties on the nodes and edges of G.

Relative-Time and Absolute-Time Patterns

Assuming that $G=(V, E, t, \lambda)$ and $P=(V_P, E_P, t_P, \lambda_P)$ are graphs, where G is a time-evolving dataset obtained by merging snapshots of the network and P is a pattern, which is a subgraph of G, an occurrence of P in G can be mapped to G. The mapping can be expressed as $\phi:V_P \rightarrow V$, where $\phi$ functionally maps a connected pair of nodes, u and v, in P to a connected pair of nodes in G such that for each mapped edge and corresponding pair, u,v, in a pattern P the following definition, Definition 1, holds true:

(i) $(u,v) \in E_P$ it is $(\phi(u), \phi(v)) \in E$, e.g., the edge between u and v, represented as (u, v), which is an edge in $E_P$, can be mapped to an edge, represented as $(\phi(u), \phi(v))$, in E;

(ii) $(u,v) \in E_P$ it is $t(\phi(u), \phi(v))=t(u,v)$; e.g., the edge, (u, v), in $E_P$ has a time label, $t(u,v)$, which is equivalent to the time label $t(\phi(u), \phi(v))$ of the edge in E identified on (i); and (iii) $\lambda_P(v)=\lambda(\phi(v)) \wedge \lambda_P ((u, v))=\lambda((\phi(u), \phi(v)))$, e.g., label(s) assigned to a node, v, in a pattern, P, is/are equivalent to the label(s) assigned to the mapped node, v, in the merged graph, G, and the label(s) assigned to the edge (u,v) in P is/are equivalent to the label(s) of the mapped edge in G.

In effect, according to at least one embodiment, a pattern, P, of nodes and edges, together with any labels associated with the nodes and edges of P, maps to at least a portion of graph G. Labels that are in addition to the time label can be optional. In case no labels are present for edges or nodes, the last condition (iii) can be ignored.

In accordance with one or more alternative embodiments, a time label can represent a relative time, which can be determined using absolute times. Advantageously, a pattern based on relative times can represent more than one subgraph of graph G; a pattern based on relative times provides a mechanism for generalizing over more than one subgraph of G. By using relative times, identified patterns can refer to patterns in more than one of the snapshots $G_1, \ldots, G_T$ combined to form G. Stated another way, two subgraphs having the same relative time labels can match a pattern that uses relative time labels regardless of whether the absolute time labels of the two subgraphs match. A relative-time pattern can be considered to be a generalization of one or more absolute-time patterns.

Referring again to FIG. 1, assume that each node in each of patterns 100 and 110 represent an author, and each edge represents a collaboration between two authors. Pattern 100 can be used to predict that given the collaboration at time 0 represented by edge 104, edge 106, which represents a collaboration between two other authors, is likely to be formed at time 1, relative to time 0; and that yet another collaboration, which is subsequent to the first and second collaborations is likely to occur, at time 2, between an author from the first and second collaborations. One primary aspect of the pattern is the fact that two distinct pairs of connected authors, one collaboration created at time 0, and one at time 1, are later (at time 2) connected by a collaboration involving one author from each pair, plus a third author. Using relative-time patterns, it is possible to account for an occurrence of that event even if it was taking place at relative times, say, 16, 17 and 18.

To accommodate a relative-time pattern, condition (ii) of Definition 1 can be modified to yield a second definition, Definition 2, which includes conditions (i) and (iii) of Definition 1 and modifies condition (ii) of Definition 1, as follows:

(ii) $(u,v) \in E_P$ it is $t(\phi(u), \phi(v))=t(u,v)+\Delta$; e.g., the edge, (u, v), in $E_P$ has a time label, $t(u,v)+\Delta$, which is equivalent to the time label $t(\phi(u), \phi(v))$ of the edge in E identified on (i), where $\Delta$ is a time increment in a relative time set, R.

Using the modified definition, naturally forming equivalence classes of structurally isomorphic relative time patterns, which differ only by a constant on their edge timestamps, can be obtained. Redundancies in the search space of all relative time patterns can be avoided by picking a representative pattern for each equivalence class, e.g., a pattern where the lowest time-stamp is zero.

Support

In accordance with one or more embodiments, a pattern has an associated support measurement. The support for a pattern P in a graph G can be determined to be the total number of occurrences of the pattern in G. This approach to determining a support for a pattern is not anti-monotonic, however. In accordance with one or more embodiments, support for a pattern is anti-monotonic if the support of the pattern is never larger than the support of a subpattern, or child subgraph, of the pattern. By adopting an approach in which a pattern's support is anti-monotonic, computation is feasible; processing and memory usage for graph mining, for example, is reasonable. In accordance with one or more embodiments, one technique that can be used to ensure anti-monotonicity of a pattern is to make a determination of a support for a pattern P in graph G based on a number of unique nodes in the graph G to which a node of the pattern can be mapped. In so doing, it is possible to ensure that the support for a child subgraph of the pattern is at least equal to the support for the pattern. In accordance with one or more embodiments, a minimum image-based support is used, as described herein and in the paper Björn Bringmann and Siegfried Nijssen, entitled "What Is Frequent in a Single Graph?" Advances in Discover and Data Mining, 12th Pacific-Asia Conference, PAKDD 2008, Osaka, Japan, May 20-23, 2008, which is incorporated herein in its entirety.

Figure 2:
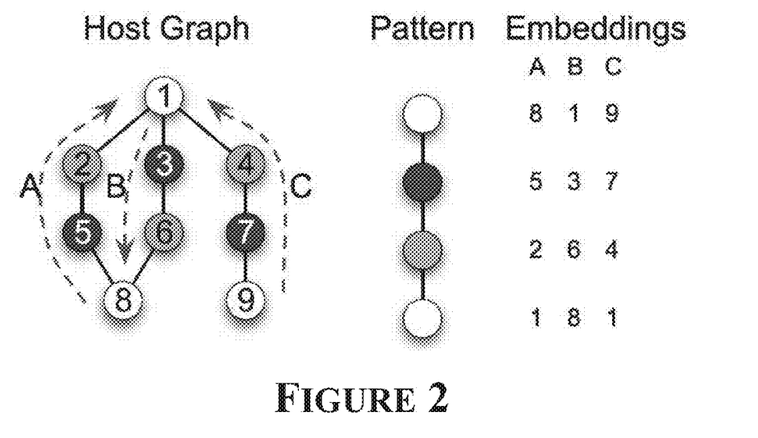
FIG. 2 illustrates a support for an exemplary graph in accordance with one or more embodiments of the disclosure.

FIG. 2 illustrates a support for an exemplary graph in accordance with one or more embodiments of the disclosure. In the example of FIG. 2, a graph, titled "Host Graph, has nine nodes, numbered 1 to 9. Shading is used to indicate comparable nodes for purposes of determining a pattern in this example. As shown in the example, white nodes 1, 8 and 9 are comparable, light gray nodes 2, 4 and 6 are comparable, and dark gray nodes 3, 5 and 7 are comparable. A pattern exists in the host graph of a white node, dark gray node, light gray node, and white node. The arrow labeled "A" shows a graph traversal from node 8 (a white node), to node 5 (a darker gray node), to node 2 (a light gray node) to node 1 (a white node). Traversal "A" can be considered an occurrence of the pattern in the host graph. The first column under "Embeddings", i.e., the column labeled "A" shows the nodes in occurrence "A" of the pattern. The columns labeled "B" and "C" show the nodes in occurrences "B" and "C"

(respectively) of the pattern. In the example, there are three occurrences of the pattern. However, while the nodes in "A" and "C" are unique, the nodes in "A" and "C" are not unique, since the last node in occurrence "A" and "C" is the same node 1. Stated alternatively, in the example, each of the upper three nodes of the pattern can be mapped to three nodes, which are unique for each occurrence of the pattern, but the lower white node of the pattern can only be mapped to two unique nodes. In accordance with one or more embodiments, the support for the pattern shown in FIG. 2 is assigned a value equal to two, or the number of occurrences of the pattern that have unique nodes at each node in the pattern. Since the lower white note in the pattern is not unique in occurrences "A" and "C," one of the occurrences is not counted in determining the support for the pattern, in accordance with one or more such embodiments. The support of the pattern assigned a value of 2, even though the number of occurrences of the pattern is three, since two of the occurrences share a node, e.g., the lower white node, of the pattern.

Figure 3:
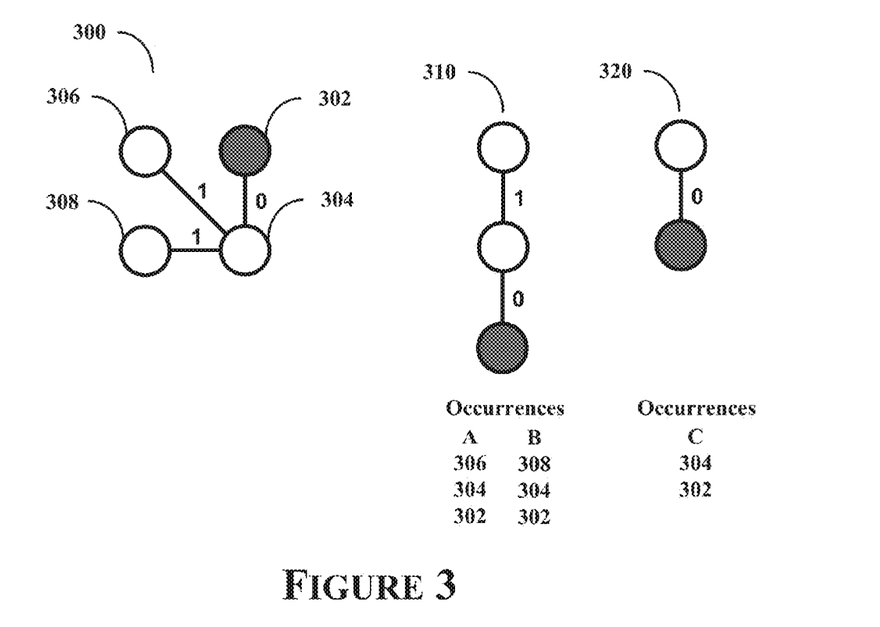
FIG. 3 shows support for another pattern in accordance with one or more embodiments of the present disclosure.

FIG. 3 shows support for another pattern in accordance with one or more embodiments of the present disclosure. In the example, patterns 310 and pattern 320 are found in graph 300. Patterns 310 and 320 are subgraphs of graph 300, and pattern 320 is a subgraph of pattern 310. To satisfy antimonotonicity, the support for pattern 320 should be at least equal to the support for pattern 310. There are two occurrences, occurrences "A" and "B", of pattern 310 in graph 300, and one occurrence, occurrence "C", of pattern 320 in graph 300. While the total number of occurrences of pattern 310 is intuitively a meaningful measure, it is not antimonotonic, since the number of occurrences in graph 300 of pattern 310 is greater than the number of occurrences of pattern 320, a subgraph of pattern 310. Stated another way, the number of occurrences in graph 300 of pattern 320 is 1, while the number of occurrences of its supergraph, pattern 310, is 2, thus violating anti-monotonicity.

In accordance with at least one embodiment, a support measurement, which does not require solving a maximum independent set problem, is used. The support measurement is based on the number of unique nodes in the graph $G=(V_G, E_G)$ that a node of the pattern $P=(V_P, E_P)$ is mapped to, and can be defined using the following exemplary definition, Definition 3:

$$\sigma(P, G) = \min_{v \in V_P} |\{\varphi_i(v) : \varphi_i \text{ is an occurrence of } P \text{ in } G\}|$$

The above approach is advantageous to a measurement that relies on solving a maximum independent set problem, MIS, which is NP-complete, for at least the reason that it is computationally easier to calculate since it does not require the computation of all possible occurrences of a pattern in a graph. Additionally, it does not require solving a maximal independent set problem for each candidate pattern. As a further advantage, the above approach is theoretically an upper bound for overlap-based approaches, so that the support according to the above method is closer to a real number of occurrences in the graph.

Graph Evolution Rule (GER) and Confidence

Support of a pattern provides insight into how often such an event may happen compared to other changes. Confidence provides a likelihood for a given sequence of steps. In accordance with one or more embodiments, confidence information is assigned to a graph evolution rule, and represents a level, or degree, of confidence, that a pattern exists, or will exist, given an existence of a child subgraph of the pattern identified by the rule. A pattern can be decomposed into particular steps and a confidence can be determined for each transition. Each step can be represented by a graph evolution rule body→(implies) head, where both the body and head are patterns.

In accordance with one or more embodiments, a head pattern is decomposed by discarding all of the edges from the last time step in the head pattern, with the resulting pattern being the body. A GER definition, Definition 4, can be expressed in exemplary formal terms, such that given a pattern head, $P_H$, a body $P_B$:

$E_B = \{e \in E_H | t(e) < \max_{e^* \in E_H}(t(e^*))\}$ and $V_B = \{v \in V_H | \deg(v, E_B) > 0\}$, where $\deg(v, E_B)$ denotes the degree of v (where degree represents the number of edges emanating from v) with respect to the edges in $E_B$. In accordance with one or more embodiments, $P_B$ must to be connected, and the support of a GER is the support of its head.

The above definition of a body yields a unique body for each head, and a unique confidence value for each head. As such, a rule can be express by the head, without a need to include the body in the rule. By way of a non-limiting example, such a rule can be used to determine the body portion using the above definition.

Figure 4:
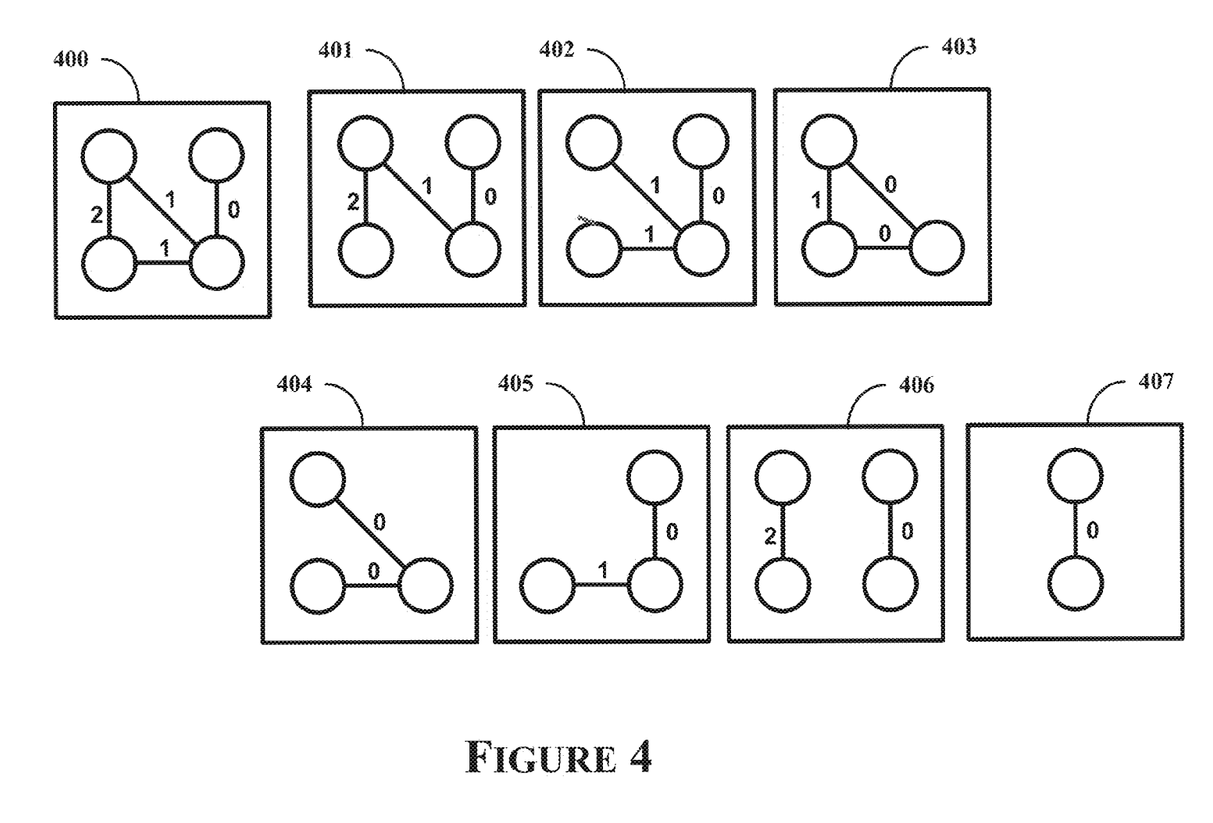
FIG. 4 provides an example of a head pattern and candidate body patterns in accordance with one or more embodiments of the present disclosure.

FIG. 4 provides an example of a head pattern and candidate body patterns in accordance with one or more embodiments of the present disclosure. In the example, pattern 400 can be decomposed into possible connected subgraphs, or child, patterns 401-407. An occurrence of 400 implies an occurrence of all of sub-patterns, or subgraphs, 401-407. Each of sub-patterns 401-407 can be considered a candidate body in order to form a graph evolution rule with pattern 400 as head. In accordance with one or more embodiments, sub-patterns 401 and 403-406 can be discarded based on a determination that these sub-patterns fail to describe an edge emerging in the future. Furthermore, sub-pattern 407 can be eliminated based on a desire to use a small time step to allow for a higher granularity. The remaining sub-pattern, sub-pattern 402, is the sub-pattern determined by decomposing pattern 400 to remove the last time step. To further illustrate, pattern 400 includes four edges, one having a time step of 0, two having a time step of 1, and one having a last time step of 2. Sub-pattern 402 is pattern 400 without the last time step of 2. Sub-pattern 402 comprises the sub-pattern that includes all but the last, in time, edge of pattern 400.

The approach used in accordance with at least one embodiment prevents disconnected graphs as a body, which addresses a lack of a support definition for a disconnected graph. As a result, some frequent patterns may not be decomposed into graph evolution rules. With reference to graph 100 in FIG. 1, after removing all edges with the last, e.g., highest, time stamp, which results in edges 108 with a label equal to 2 being removed, and discarding disconnected nodes, e.g., discarding the upper-most node 102 connected to the graph by edges 108, the graph that remains is a disconnected pattern containing two disconnected components, e.g., a first component that contains nodes 102 connected by edge 106 with label 1, and a second component containing nodes 102 connected by edge 104 with label 0. In accordance with at least one embodiment, since the 1-edge graphs are disconnected support for the disconnected pattern need not be determined, and graph 100 is not decomposed into a GER. With reference to graph 110 of FIG. 1, removal of the last time step, e.g., removal of edges 108, and removal of the node 102 connected to the graph via an edge 108 yields a connected sub-pattern, e.g., nodes 102 connected by edges 104 and 106. In accordance with at least one embodiment, the resulting sub-pattern can be used as the body for graph 110 in a GER.

As discussed above, a GER can be represented explicitly by identifying both the body and head patterns, as described above, or implicitly by identifying the head. As discussed above, the body of the rule can be obtained easily by removing the edges with the highest step and any nodes disconnected from the head, e.g., nodes disconnected as a result of the edge removal. By way of a non-limiting example, a GER can be expressed simply as graph 110.

In accordance with at least one embodiment, a confidence score for a GER is determined as a ratio of the support for the head of the GER to the support for the body of the GER. The ratio can be expressed as: $Support_H/Support_B$. With the support being anti-monotonic, the support for the body will be at least as great as the support for the head, which yields a confidence value between zero and one.

Graph Evolution Rule Mining (GERM)

In accordance with one or more embodiments, frequent, connected patterns, or graphs are identified in a dataset, which contains a graph obtained by merging multiple graphs representing snapshots of a network. The identified patterns are then used to generate GERs for the network. In accordance with at least one embodiment, a depth-first search strategy is used to mine the graph to identify patterns in the graph. A DFS traversal of the search space leads to very low memory requirements. In performed tests, memory consumption was negligible. GERMS is an adaptation of an algorithm, gSpan described in the article entitled "gSpan: Graph-Based Substructure Pattern Mining", by Xifeng Xan and Jiawei Han, (Expanded Version, UIUC Technical Report, UIUCDCS-R-2002-2296), which is incorporated herein by reference. The adaptation is used to mine a single graph obtained by merging temporal snapshots of a network for frequent, connected subgraphs in the graph, which subgraphs are analyzed to identify patterns, each of which can be representative of an equivalence class of structurally isomorphic relative time patterns that differ by a constant on the edge time steps, or time stamps.

The gSpan algorithm identifies frequently-occurring 1-edge graphs, each of which comprises two nodes and an edge connecting the two nodes, in a set of graphs, GS. More particularly, gSpan removes infrequent vertices and edges, relabels the remaining vertices and edges in descending frequency, and uses the highest frequency DFS code as a starting node for its minimum DFS code canonical form. The frequently-occurring 1-edge subgraphs are used to discover all of the possible child subgraphs that grow from the 1-edge subgraph, e.g., 1-edge frequent subgraph is grown to one or more 2-edge frequent subgraphs, which are grown to one or more 3-edge frequent subgraphs. The gSpan algorithm uses a DFS code that consists of a 5-tuple to designate an edge, i.e., (i, j, $l_{(i,j)}$, $l_j$), where i and j designate the nodes, or vertices, $l_i$ designates the label for vertex i, $l_j$ designates the vertex label for vertex j, and $l_{(i,j)}$ designates the label for the edge. An initial set of steps in the gSpan algorithm sorts the labels of the vertices and edges in the set of graphs by their frequency, removes infrequent vertices and edges based on their determined frequencies, relabels the remaining vertices and edges in descending frequency, sorts the frequent 1-edge graphs remaining in the GS in lexicographic order based on the 5-tuple. For example, a 5-tuple of (0, 1, A, a, A)<the 5-tuple (0, 1, A, a, B)< . . . .

The gSpan has a procedure, Subgraph_Mining, to grow child subgraphs rooted by a 1-edge frequent subgraph. The procedure mines multiple graphs in a set, GS, for the child subgraphs. The procedure is executed, or run, recursively. In each recursive run, the procedure grows one edge from a node s, which initially is a node of the 1-edge subgraph and thereafter is a node of a child subgraph of the 1-edge subgraph. The recursion follows a depth first traversal, such that a minimum DFS code of previously-discovered subgraphs are less than the minimum DFS code of later discovered ones. Initially, the procedure prunes duplicate subgraphs and all of their descendants. If s is the minimum DFS code of the graph it represents, the procedure adds s to its frequent subgraph set, and then generates all potential children with one edge growth, and recursively runs the procedure on each child whose support satisfies a minimum support threshold. An enumeration procedure locates s in all of the graphs in the graph dataset, GS, and counts the occurrences of all of the children of s over all the graphs GS.

Like gSpan, GERM mines using a DFS approach. In contrast to gSpan's mining a set of graphs consisting of multiple graphs, however, GERM mines a single graph, which is obtained by merging graphs that are temporal snapshots of a network. Thus, GERM extracts patterns from a single graph. In further contrast, GERM has edge labels that represent a time of the edge. Furthermore, GERM replaces gSpan's support calculation, which amounts to a frequency of occurrence of a subgraph (e.g., the number of graphs in the set in which the subgraph occurs or the number of occurrences of the subgraph in the set of graphs) with a minimum image-based support calculation, which is anti-monotonic, as described herein. The following provides some exemplary pseudo code of steps of a Subgraph_Mining procedure used by GERM in accordance with one or more disclosed embodiments:

---

Algorithm 1 - SubgraphMining(GS, S, s)

1: if s ≠ min(s) then return // using canonical form with lowest time stamp
2: S ← S ∪ s
3: generate all s' potential children with one edge growth
4: Enumerate(s)
5: for all c, c is s' child do
   6: // using definition of support based on relative or absolute time
   7: if support(c) ≥ minSupp then
      8: s ← c
      9: SubgraphMining(GS, S, s)

---

One of the key elements in gSpan is the use of the minimum DFS code, which is a canonical form introduced to avoid multiple generations of the same pattern. In contrast gSpan's using a minimum DFS code that represents the highest-frequency 1-edge graph and selecting the minimum DFS code for s, GERM's canonical form includes a time stamp, and selects a 1-edge graph that has the lowest time stamp. As discussed hereinabove, embodiments of the present disclosure identify one representative pattern per equivalence class; e.g., one pattern with the lowest time stamp being zero, which represents t or an increment of t, e.g., t+Δ, t+2Δ, etc. This is achieved by modifying the canonical form such that the first edge in the canonical form is always the one with the lowest time stamp, e.g., absolute time stamp, as compared to gSpan, in which the highest label is used as a starting node for the canonical form. Any pattern grown from such a pattern with the modified canonical form will have the same lowest time stamp, which is set to zero, based on a simple constraint on the first edge. This ensures that only one pattern per equivalence class is extracted, which dramatically increases performance and eliminates redundancy in the output.

In accordance with one or more embodiments, the graph obtained by merging snapshots of a network uses edge labels in absolute time, and a pattern uses relative time, with an initial edge having a relative time of zero. In accordance with one or more such embodiments, when matching a pattern to the merged graph, the value of Δ, which represents a time gap between the pattern and the merged graph is a fixed value. A match between the pattern and the merged graph exists where all of the remaining edges adhere to this value of Δ, or increments of Δ. If all the edges match with the Δ set when matching the first edge, the pattern is discovered to match the merged graph with that value of Δ.

Large graphs and high degrees give rise to increased computational complexity of the search. In particular, having nodes with large degree increases the possible combinations that have to be evaluated for each subgraph-isomorphism test. In accordance with one or more embodiments, large graphs, e.g., graphs which have several nodes and high degree nodes, or nodes with a high number of edges, are managed using a with a user-defined constraint specifying the maximum number of edges in a pattern. Typically, applications of frequent subgraph mining in the transactional setting, such as biology and chemistry, the graphs are typically of small size and are not high-degree nodes. The user-defined constraint specifies the maximum number of edges in a pattern. This constraint more efficiently deals with the DFS strategy by reducing the search space.

Figure 5:
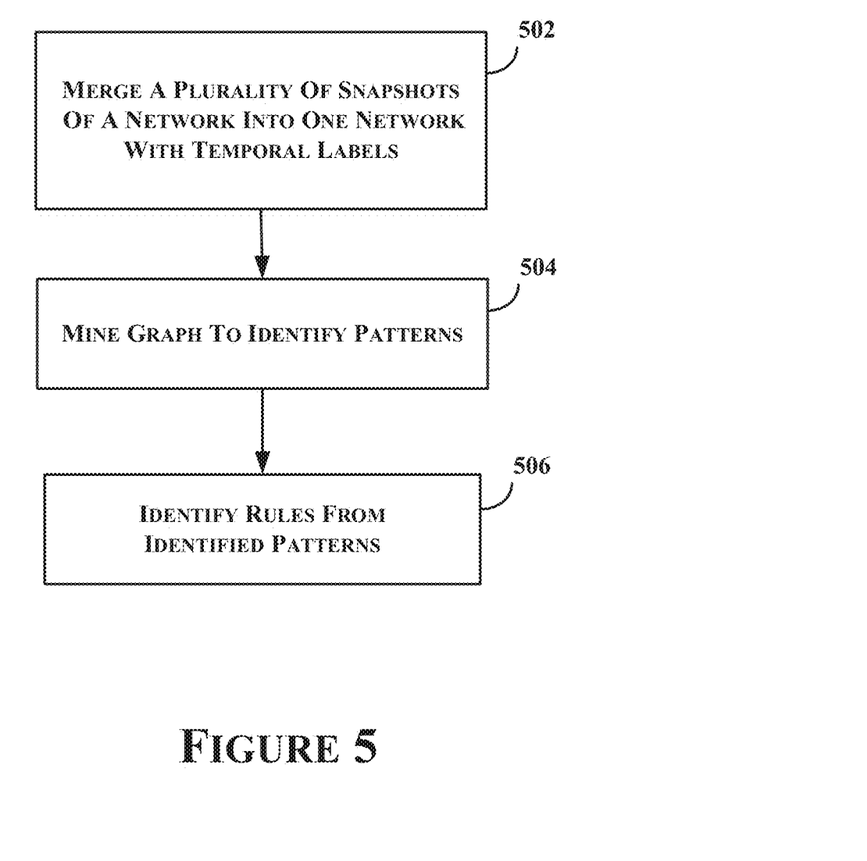
FIG. 5 provides an example of a rule generation and usage process flow in accordance with one or more embodiments of the present disclosure.
Figure 7:
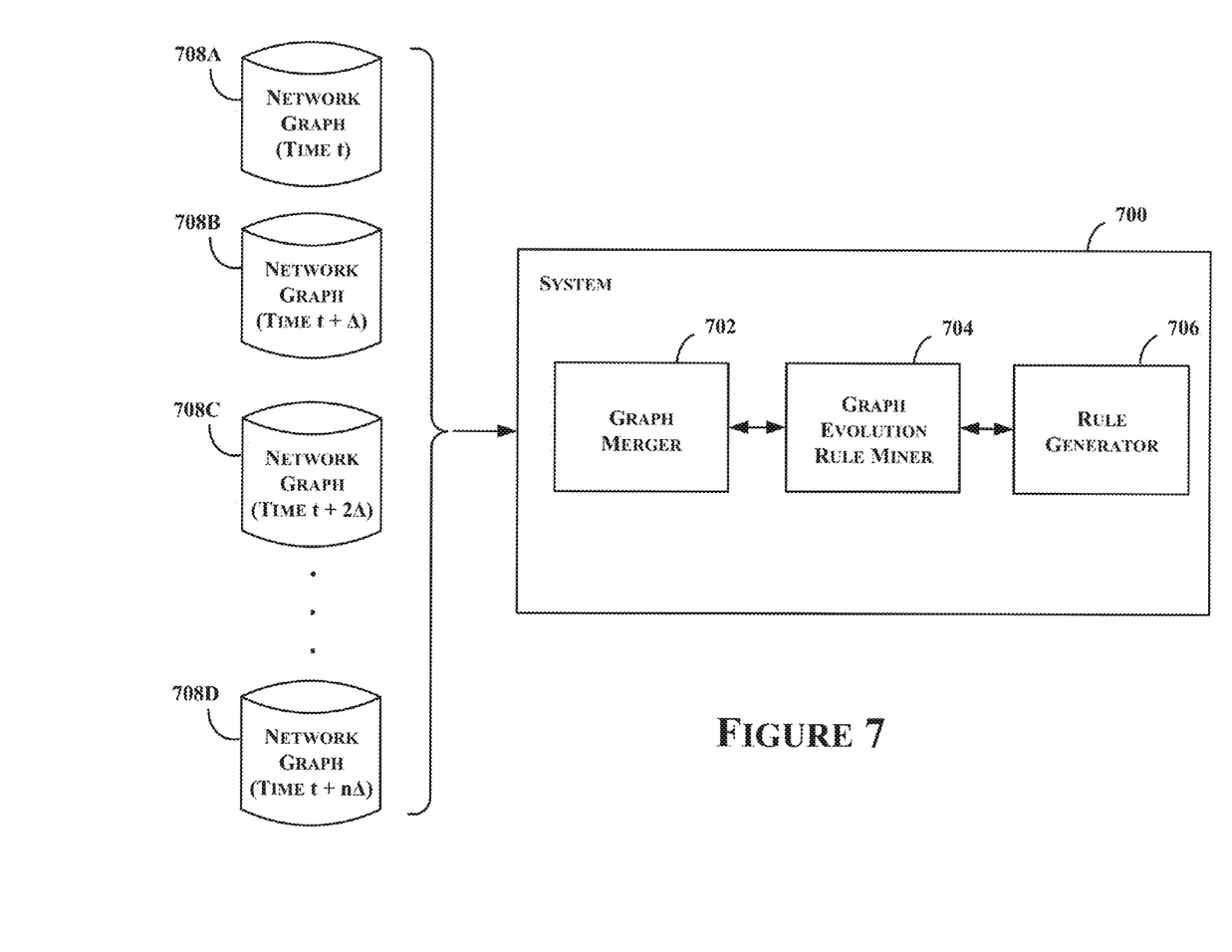
FIG. 7 provides an overview of an exemplary system in accordance with one or more embodiments of the present disclosure.

FIG. 5 provides an example of a rule generation and usage process flow in accordance with one or more embodiments of the present disclosure. In accordance with one or more embodiments, the process flow can be implemented from program code executed by one or more computing devices. FIG. 7 provides an example of a computing system, which comprising one or more computing device, implementing functionality in accordance with one or more embodiments of the present disclosure.

At step 502, a plurality of snapshots of a network, such as without limitation a social network, are merged to generate a combined representation of the network's evolution over time. In accordance with at least one embodiment and with reference to FIG. 7, each snapshot is in a form of a graph, which represents the network at a time that the snapshot of the network is taken. By way of a non-limiting example, the network can be in graph form, and a snapshot can be taken by saving a copy of the network graph. In accordance with at least one embodiment, a snapshot is taken at time t and at increments defined by Δ, which can be any increment of time, e.g., minute, hour, day, week, etc. By way of a non-limiting example, the increment can be based on the degree to which the network changes over time, which can be determined using GERs generated for the network, or another network.

In accordance with one or more embodiments, the merged graph has a time property, an absolute time property, as a label associated with each edge, which identifies a time of a connection between two nodes, e.g., the time of the snapshot in which the edge first appears. By way of some non-limiting examples, an edge label in absolute time can be t, t+Δ, t+2Δ, ..., t+nΔ, and in relative time, the time label can be 0, 1, 2, etc., or the multiplier applied to Δ. In accordance with one or more embodiments, a minimum support threshold can be based on the Δ, e.g., a greater threshold is used for a Δ of month(s) as compared to a Δ of week(s). In accordance with at least one embodiment, step 502 is performed by a graph merging component, graph merger 702, of system 700.

Referring again to FIG. 5, the merged graph is analyzed to identify a plurality of subgraphs of the merged graph. As discussed above, in accordance with at least one embodiment, a GERM procedure is used to grow 1-edge subgraphs identified in the merged graph to identify subgraphs. The GERM procedure identifies equivalence classes of structurally isomorphic relative time patterns which differ by a constant on their edge time stamps. In accordance with one or more embodiments, the pattern selected for each equivalence class represents the equivalence class and is the pattern where the lowest time stamp is set to zero. As discussed above, in accordance with at least one embodiment, the first edge, e.g., the edge in the 1-edge subgraph, used by GERM to grow a subgraph is the edge with the lowest time stamp. This is in contrast to gSpan, where the highest-frequency label is used as a starting node to grow a subgraph. In accordance with one or more embodiments, step 504 is performed by component 704 (of FIG. 7), which implements GERM.

At step 506 of FIG. 5, GERs are generated from the subgraphs of the merged graph identified in step 504. Briefly, patterns are identified from the identified subgraphs, a child subgraph of an identified pattern is selected, a rule is formed from the identified pattern and child, and a confidence score is generated for the rule using the support for the pattern and the support for the child. In accordance with one or more embodiments of the present disclosure, step 506 is implemented by a rule generator 706 component of system 700.

Figure 6:
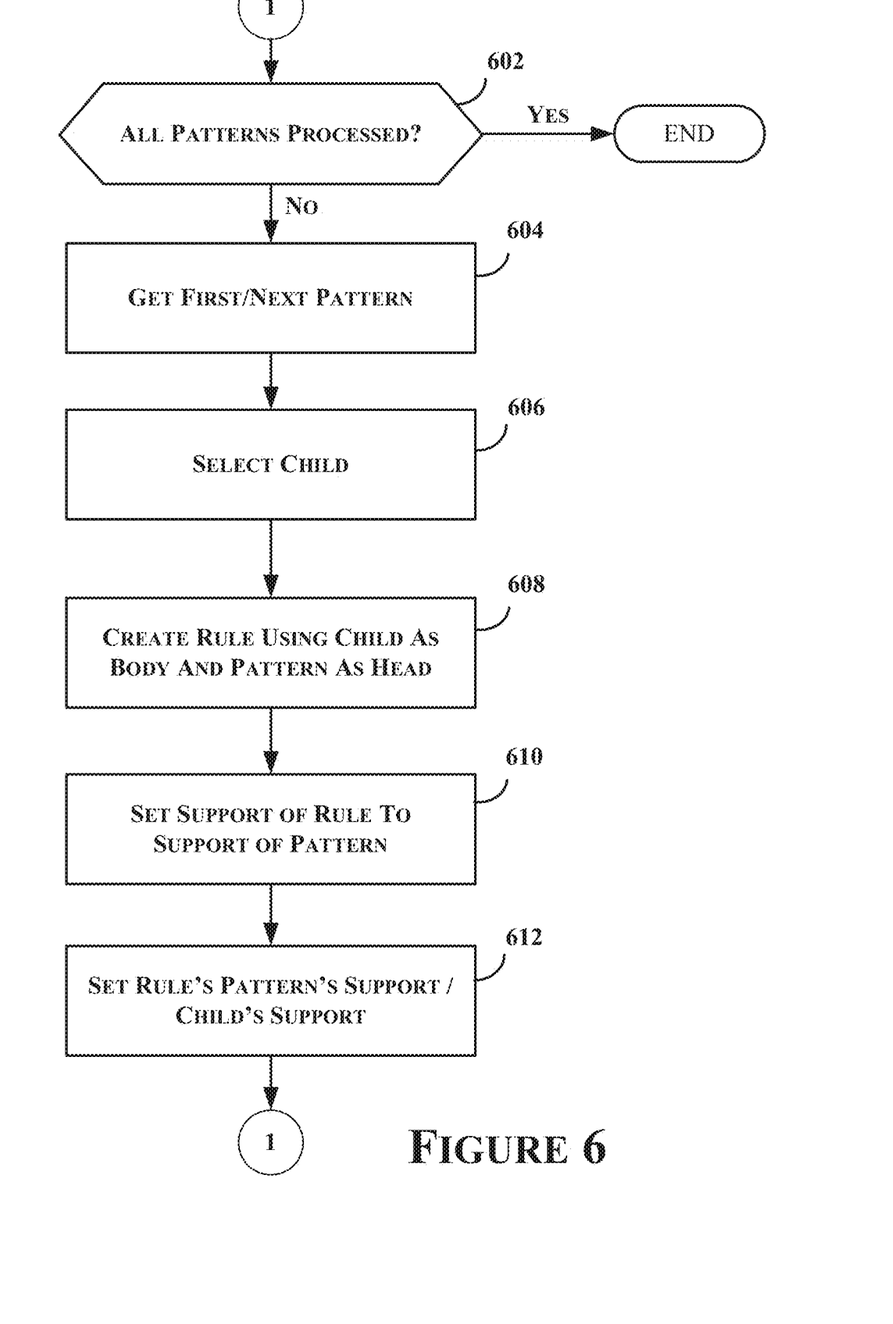
FIG. 6 provides a rule generation process flow in accordance with one or more embodiments of the present disclosure.

FIG. 6 provides a rule generation process flow in accordance with one or more embodiments of the present disclosure. In accordance with one or more such embodiments, the process flow can be implemented by rule generator 706 of system 700.

At step 602, a determination is made whether or not all of the pattern subgraphs identified in step 504 of FIG. 5 have been processed. If so, processing ends. If not, processing continues at step 604 to get the first, or next, pattern to be processed. At step 606, a child subgraph identified by GERM is selected for the pattern. By way of a non-limiting example, the selected child subgraph is a subgraph that includes all but the last, in time, edge of the current pattern.

In accordance with one or more embodiments, since the support for the current pattern is anti-monotonic, the support for the selected child subgraph in the merged graph is at least equal to the current pattern.

Processing continues at step 608 to create a GER, e.g., body→(implies) head, using the selected child subgraph as the body and the current pattern as the head. At step 610, a support equal to the support of the pattern is assigned for the generated GER. At step 612, a confidence score is assigned to the GER, which is a ratio of the pattern's support to the child's support.

Typically, the number of edge deletions in a network, e.g., a social network, is so small to be negligible when analyzing a temporal evolution of the network. In accordance with one or more embodiments, deletions can be accommodated by making a modification to a matching operator to handle edge deletions. In the following example, it is assumed that an edge can appear and disappear once. The extension considers two time-stamps $t_I$ (time of insertion) and $t_D$ (time of deletion) on each edge instead of a single time t. Condition (ii) of definitions 1 and 2 becomes:

(ii) for each edge, (u, v), in $E_P$, $t_I(\phi(u), \phi(v))=t_I(u,v)+\Delta$ and $t_D(\phi(u), \phi(v))=t_D(u,v)+\Delta$.

In accordance with one or more embodiments of the present disclosure, one or more computing devices are configured to comprise functionality described herein. The computing device can be, without limitation, a server, personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device can include one or more processors, memory, a removable media reader, network interface, display and interface, and one or more input devices, e.g., keyboard, keypad, mouse, etc. and input device interface, for example. One skilled in the art will recognize that the computing device may be configured in many different ways and implemented using many different combinations of hardware, software, or firmware.

In an embodiment, the GERs are generated for a network that is defined based on information obtained via computing devices interconnected via a computer network. In accordance with one or more embodiments, the computer network may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

Figure 8:
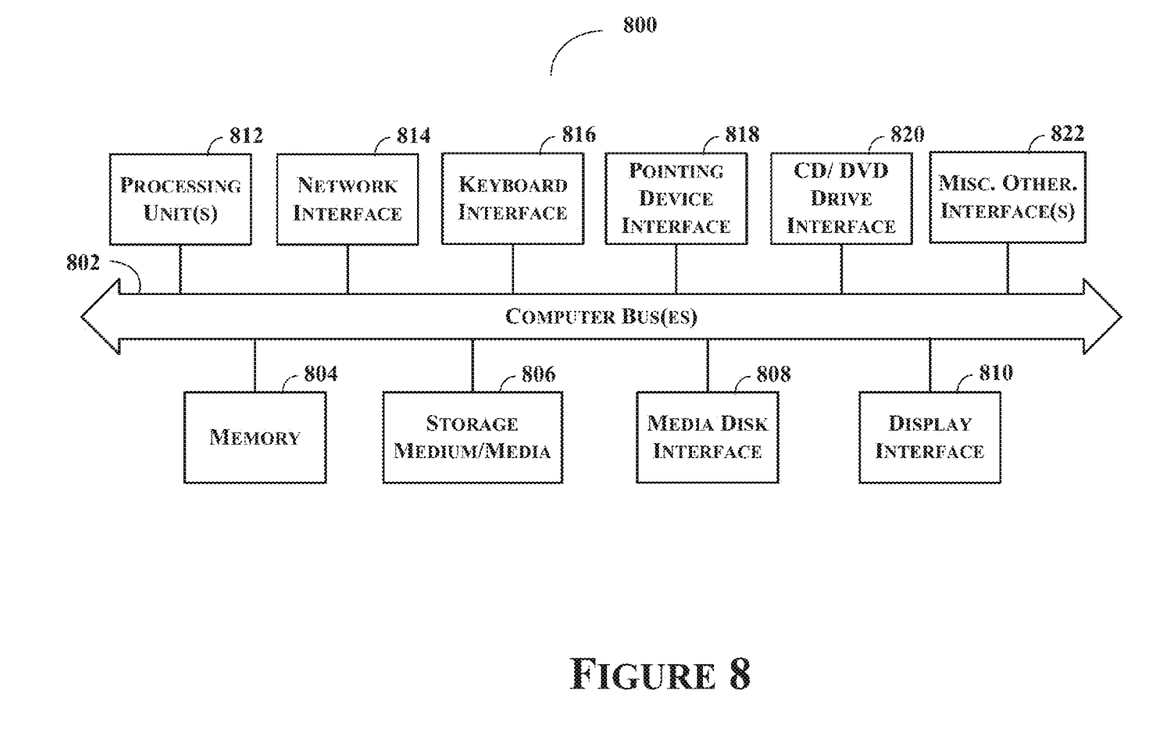
FIG. 8 provides an example of a block diagram illustrating an internal architecture of a computing device in accordance with one or more embodiments of the present disclosure.

FIG. 8 is a detailed block diagram illustrating an internal architecture of a computing device, e.g., a computing device of system 700, in accordance with one or more embodiments of the present disclosure. As shown in FIG. 8, internal architecture 800 includes one or more processing units (also referred to herein as CPUs) 812, which interface with at least one computer bus 802. Also interfacing with computer bus 802 are computer-readable storage medium, or media, 806, network interface 814, memory 804, e.g., random access memory (RAM), run-time transient memory, read only memory (ROM), etc., media disk drive interface 808 as an interface for a drive that can read and/or write to media including removable media such as floppy, CD-ROM, DVD, etc. media, display interface 810 as interface for a monitor or other display device, keyboard interface 816 as interface for a keyboard, pointing device interface 818 as an interface for a mouse or other pointing device, and miscellaneous other interfaces not shown individually, such as parallel and serial port interfaces, a universal serial bus (USB) interface, and the like.

Memory 804 interfaces with computer bus 802 so as to provide information stored in memory 804 to CPU 812 during execution of software programs such as an operating system, application programs, device drivers, and software modules that comprise program code, and/or computer-executable process steps, incorporating functionality described herein, e.g., one or more of process flows described herein. CPU 812 first loads computer-executable process steps from storage, e.g., memory 804, fixed disk 806, removable media drive, and/or other storage device. CPU 812 can then execute the stored process steps in order to execute the loaded computer-executable process steps.

Stored data, e.g., data stored by a storage device, can be accessed by CPU 812 during the execution of computer-executable process steps.

Persistent storage, e.g., fixed disk 806, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code executable by a computer, in machine readable form. By way of example, and not limitation, a computer readable medium may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
collecting, by at least one processing unit, multiple graphs corresponding to a network, the network evolving over time, each graph representing a snapshot reflecting a state of the network;
forming, by the at least one processing unit, one graph by merging the multiple graphs representing the multiple snapshots of the network, the formed graph comprising a set of nodes and a set of edges, each edge connecting two nodes from the set of nodes and having a temporal label;
mining, by the at least one processing unit, the formed graph to identify multiple patterns, each pattern being a subgraph in the formed graph, each pattern having an associated support;
selecting a pattern from the identified patterns;
identifying, by the at least one processing unit, a child pattern of the selected pattern, the identified child pattern having a support that is at least equal to the support of the selected pattern and missing a portion of pattern, the missing portion of the pattern including at least one edge of the pattern;
creating, by the at least one processing unit, a graph evolution rule, the rule indicating that any occurrence of the child pattern implies a corresponding occurrence of the pattern, the corresponding occurrence of the pattern being formed with the addition of the portion missing from the child pattern at a time indicated by the missing edge's temporal label; and
assigning a support to the graph evolution rule, the assigned support being equal to the support of the pattern.

2. The method of claim 1, wherein the temporal label in the formed graph is absolute time and the missing edge's temporal label is relative time.

3. The method of claim 1, wherein the temporal label of an initial edge of the pattern and child pattern is a relative time of zero.

4. The method of claim 3, wherein the child pattern is missing one edge of the pattern, the missing edge has a temporal label with the highest value in the pattern.

5. The method of claim 1, wherein the support of the pattern is a minimum possible number of mappings of a node of the pattern in the formed graph.

6. The method of claim 1, further comprising:
assigning a confidence to the graph evolution rule, the assigned confidence is equal to a ratio of the support of the pattern to the support of the child pattern.

7. The method of claim 1, identifying a child pattern of the pattern further comprising:
identifying, by the at least one processing unit, the child pattern of the pattern that includes all but one of the edges of the pattern, the missing edge having a temporal label that has the greatest value of the temporal labels assigned to edges of the selected pattern.

8. A system comprising:
at least one computing device, the at least one computing device comprising a processor and a non-transitory computer readable storage medium having stored thereon processor-executable components comprising:
a graph merging component that:
collects multiple graphs corresponding to a network, the network evolving over time, each graph representing a snapshot reflecting a state of the network;
forms one graph by merging the multiple graphs representing the multiple snapshots of the network, the formed graph comprising a set of nodes and a set of edges, each edge connecting two nodes from the set of nodes and having a temporal label;
a mining component that mines the formed graph to identify multiple patterns, each pattern being a subgraph in the formed graph, each pattern having an associated support;
a graph evolution rule generator that:
selects a pattern from the identified patterns;
identifies a child pattern of the selected pattern, the identified child pattern having a support that is at least equal to the support of the selected pattern and missing a portion of pattern, the missing portion of the pattern including at least one edge of the pattern;
creates a graph evolution rule, the rule indicating that any occurrence of the child pattern implies a corresponding occurrence of the pattern, the corresponding occurrence of the pattern being formed with the addition of the portion missing from the child pattern at a time indicated by the missing edge's temporal label; and
assigns a support to the graph evolution rule, the assigned support being equal to the support of the pattern.

9. The system of claim 8, wherein the temporal label in the formed graph is absolute time and the missing edge's temporal label is relative time.

10. The system of claim 8, wherein the temporal label of an initial edge of the pattern and child pattern is a relative time of zero.

11. The system of claim 10, wherein the child pattern is missing one edge of the pattern, the missing edge has a temporal label with the highest value in the pattern.

12. The system of claim 8, wherein the support of the pattern is a minimum possible number of mappings of a node of the pattern in the formed graph.

13. The system of claim 8, wherein the graph evolution rule generator assigns a confidence to the graph evolution rule, the assigned confidence is equal to a ratio of the support of the pattern to the support of the child pattern.

14. The system of claim 8, the graph evolution rule generator identifies a child pattern of the pattern by identifying the child pattern of the pattern that includes all but one of the edges of the pattern, the missing edge having a temporal label that has the greatest value of the temporal labels assigned to edges of the selected pattern.

15. A non-transitory computer-readable medium tangibly storing thereon computer-executable process steps, the process steps comprising:
collecting multiple graphs corresponding to a network, the network evolving over time, each graph representing a snapshot reflecting a state of the network;
forming one graph by merging the multiple graphs representing the multiple snapshots of the network, the formed graph comprising a set of nodes and a set of edges, each edge connecting two nodes from the set of nodes and having a temporal label;
mining the formed graph to identify multiple patterns, each pattern being a subgraph in the formed graph, each pattern having an associated support;
selecting a pattern from the identified patterns;
identifying a child pattern of the selected pattern, the identified child pattern having a support that is at least equal to the support of the selected pattern and missing a portion of pattern, the missing portion of the pattern including at least one edge of the pattern;

creating a graph evolution rule, the rule indicating that any occurrence of the child pattern implies a corresponding occurrence of the pattern, the corresponding occurrence of the pattern being formed with the addition of the portion missing from the child pattern at a time indicated by the missing edge's temporal label; and assigning a support to the graph evolution rule, the assigned support being equal to the support of the pattern.

16. The medium of claim 15, wherein the temporal label in the formed graph is absolute time and the missing edge's temporal label is relative time.

17. The medium of claim 15, wherein the temporal label of an initial edge of the pattern and child pattern is a relative time of zero.

18. The medium of claim 17, wherein the child pattern is missing one edge of the pattern, the missing edge has a temporal label with the highest value in the pattern.

19. The medium of claim 15, wherein the support of the pattern is a minimum possible number of mappings of a node of the pattern in the formed graph.

20. The medium of claim 15, the process steps further comprising:

assigning a confidence to the graph evolution rule, the assigned confidence is equal to a ratio of the support of the pattern to the support of the child pattern.

21. The medium of claim 15, identifying a child pattern of the pattern further comprising a process step of:

identifying the child pattern of the pattern that includes all but one of the edges of the pattern, the missing edge having a temporal label that has the greatest value of the temporal labels assigned to edges of the selected pattern.

* * * * *